United States Patent  
Carillo, Jr. et al.

(10) Patent No.: US 6,292,119 B1
(45) Date of Patent: Sep. 18, 2001

(54) DELAYED PULSE SATURABLE ABSORBER-BASED DOWNWARD-FOLDING OPTICAL A/D

(75) Inventors: Juan C. Carillo, Jr., Torrance; Bruce A. Ferguson; Richard A. Fields, both of Redondo Beach; Mark Kintis; Elizabeth T. Kunkee, both of Manhattan Beach; Lawrence J. Lembo, Torrance; Stephen R. Perkins, Redondo Beach; David L. Rollins, Hawthorne; Eric L. Upton, Redondo Beach, all of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/345,295

(22) Filed: Jun. 30, 1999

(51) Int. Cl.[7] ...................................................... H03M 1/00
(52) U.S. Cl. ........................................... 341/137; 341/155
(58) Field of Search ..................................... 341/137, 155; 359/325, 237, 161; 250/214 C, 214 R; 372/26, 29, 30, 38

(56) References Cited

U.S. PATENT DOCUMENTS

| 4,901,275 | * | 2/1990 | Hardie et al. | 341/137 |
| 5,264,849 | * | 11/1993 | Kondoh et al. | 341/137 |
| 5,675,428 | * | 10/1997 | Henmi | 359/161 |

\* cited by examiner

Primary Examiner—Michael Tokar
Assistant Examiner—Jean B. Jeanglaude

(57) ABSTRACT

An optical analog-to-digital converter (10) that makes use of a downward-folding successive approximation conversion scheme that employs subtraction of optical signals. A pulsed optical signal (20) to be converted is applied as an input to each of a plurality of converter channels (12, 14, 16, 18), where each channel (12, 14, 16, 18) outputs one of the bits of the digital output of the converter (10). The input signal (20) to each channel (12, 14, 16, 18) is sent to a thresholding device (24, 40, 60, 80) that determines whether the intensity of the signal is greater than or less than a predetermined threshold value. The first channel thresholding device (24) compares the input signal (20) to a threshold value that is one-half of a known maximum intensity. Subsequent channel thresholding devices (40, 60, 80) compare the input signal to a threshold value that is one-half of the intensity used in the previous channel in a downward-folding scheme. If the intensity of the input signal (20) is greater than the threshold value in a particular channel (12, 14, 16, 18), then that threshold value is subtracted from the input signal (20) in each of the successive channels before being applied to the thresholding device (40, 60, 80) in that channel (14, 16, 18). The subtraction elements (38, 56, 58, 74, 76, 78) can be saturable absorbers or electro-absorption modules in a particular design. Additionally, the control signals from a particular channel (12, 14, 16, 18) to each of the successive channels to determine whether subtraction will occur can be provided by an optically controlled switch (30, 46, 66), such as a saturable absorber, or an electrically controlled switch, such as an electro-absorption module.

50 Claims, 6 Drawing Sheets

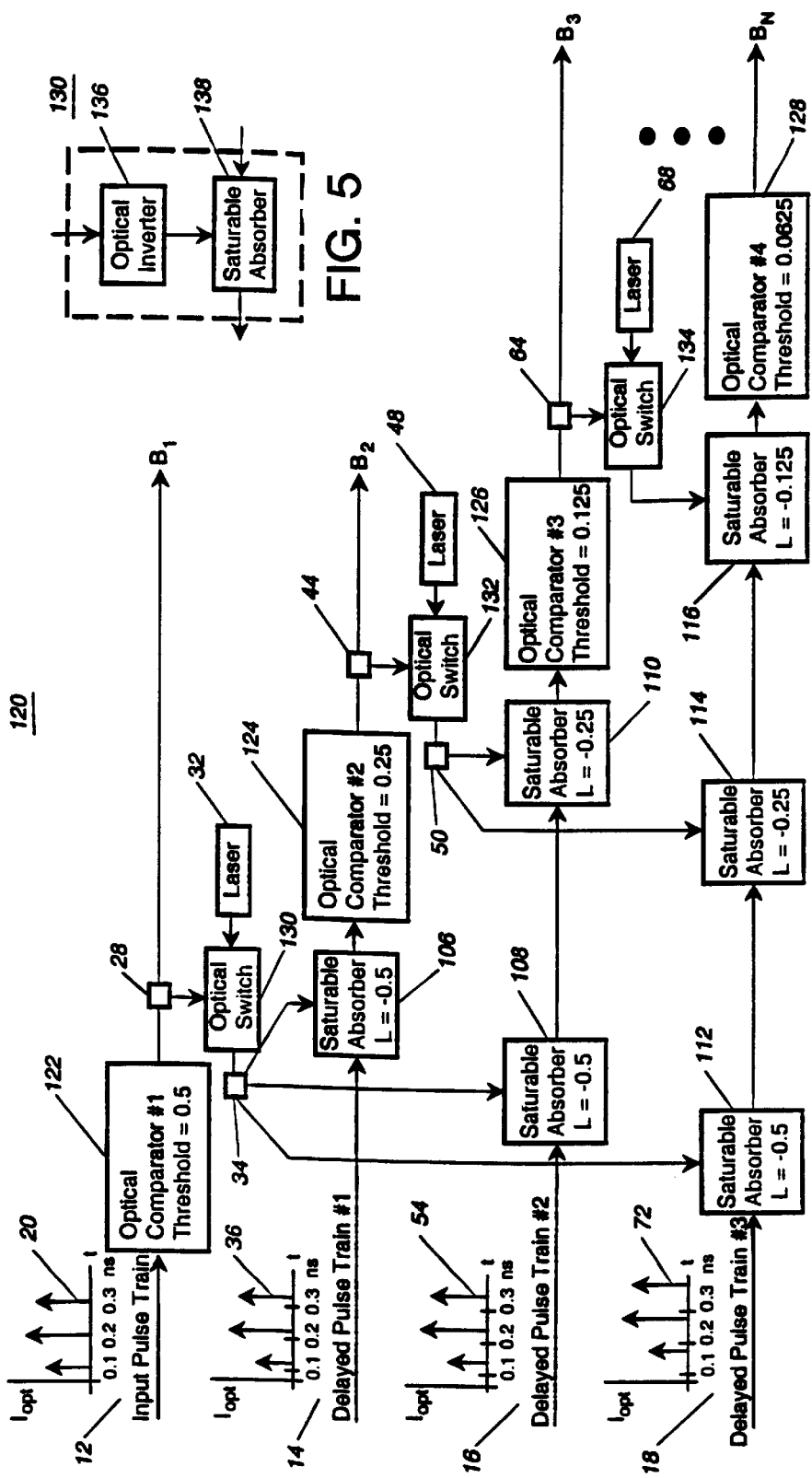

DELAYED PULSE SATURABLE ABSORBER-BASED DOWNWARD-FOLDING OPTICAL A/D

BACKGROUND OF THE INVENTION

1. Field of the Invention

This invention relates generally to an optical analog-to-digital converter and, more particularly, to an optical analog-to-digital converter that employs a downward-folding successive approximation conversion approach incorporating optical subtraction in successive stages, where saturable absorbers are used as the optical subtractors in one embodiment.

2. Discussion of the Related Art

Advances in signal processing technology, including the need for greater processing speeds, increased channel bandwidths and improved transmission reliability, has resulted in a steadily growing focus on the optical domain and the vast potential that lies therein with respect to these parameters. However, optical technology, as compared to electrical and radio frequency based technology, lacks the necessary technical sophistication in many areas. Particularly, the desire for high-speed, large-bandwidth processing devices employing digital optics has been hampered by the lack of many basic optical devices and technologies readily available in the RF domain.

Optical analog-to-digital (A/D) converters are one such device that has not heretofore met basic design requirements. Current digital optical systems rely on digital conversion in the electrical/RF domain. This requires conversions back and forth between the optical and RF domains that are slower, have more loss and are noisier than conversions in the optical domain only. An optical device that converts an optical analog signal to an optical digital signal with little or no reliance on RF technology would eliminate system complexity and provide for high speed and large bandwidth processing advances.

An especially difficult obstacle to optical analog-to-digital conversion is the need for optical subtraction. Adding optical signal intensity is relatively straight-forward and well understood, but the process of subtracting a specific amount of optical power from an optical signal is comparatively more difficult. U.S. patent application Ser. No. 09/133,138, filed Aug. 11, 1998, titled "Upward-Folding Successive-Approximation Optical Analog-To-Digital Converter and Method of Performing Conversion" and assigned to the assignee of this application, is directed to an optical A/D converter that provides an analog-to-digital conversion within the optical domain without the need to subtract optical signals. However, various applications may require an optical A/D converter that performs the conversion by employing optical subtraction.

What is needed is an optical A/D converter that employs subtraction of an optical intensity from an optical signal in an efficient and cost effective manner.

SUMMARY OF THE INVENTION

In accordance with the teachings of the present invention, an optical analog-to-digital converter is disclosed that makes use of a downward-folding successive approximation conversion scheme that employs subtraction of optical signals. A pulsed optical analog signal to be converted is applied as an input to each of a plurality of converter channels, where each channel outputs one of the bits $B_1$–$B_N$ of the digital output of the converter. The input signal to each channel is sent to a thresholding device that determines whether the intensity of the signal is greater than or less than a predetermined threshold value. The first channel thresholding device compares the input signal to a threshold value that is one-half of a known maximum intensity. Subsequent channel thresholding devices compare the input signal to a threshold value that is one-half of the intensity used in the previous channel in a downward-folding scheme. If the intensity of the input signal is greater than the threshold value in a particular channel, then that threshold value is subtracted from the input signal in each of the successive channels before being applied to the thresholding device in that channel. Therefore, for each channel m, the input signal passes through m−1 subtraction elements before reaching the thresholding device in that channel. The pulse intensity at the thresholding device in each channel is thus reduced by $L_m$, where $L_m = (B_1 * \frac{1}{2} + B_2 * \frac{1}{4} + \ldots + B_{m-1} * \frac{1}{2}^{(m-1)})$, and is in the range from 0.0 to $\frac{1}{2}^{(m-1)}$. The last thresholding device, which has a threshold value equal to $\frac{1}{2}^m$, produces the least significant bit.

The general implementation of the analog-to-digital converter of the invention includes various components that perform this general downward-folding successive approximation scheme. The converter can operate completely in the optical domain, or in a combination of the optical domain and the electrical domain. The subtraction elements can be saturable absorbers or electro-absorption modulators in a particular design. Additionally, control signals from a particular channel to each of the successive channels to determine whether subtraction will occur can be provided by an optically controlled switch, such as a saturable absorber, or an electrically controlled switch, such as an electro-absorption modulators.

Additional objects, advantages, and features of the present invention will become apparent from the following description and appended claims, taken in conjunction with the accompanying drawings.

BRIEF DESCRIPTION OF THE DRAWINGS

FIG. 4 is a schematic block diagram depicting a downward-folding optical analog-to-digital converter employing saturable absorber subtraction elements and providing an optical digital output, according to another embodiment of the present invention;

FIG. 5 is a schematic block diagram depicting an optical switch to be used in connection with the analog-to-digital converter shown in FIG. 4;

DETAILED DESCRIPTION OF THE PREFERRED EMBODIMENTS

The following description of the preferred embodiments directed to a downward-folding optical analog-to-digital converter is merely exemplary in nature, and is in no way intended to limit the invention or its applications or uses.

Figure 1:
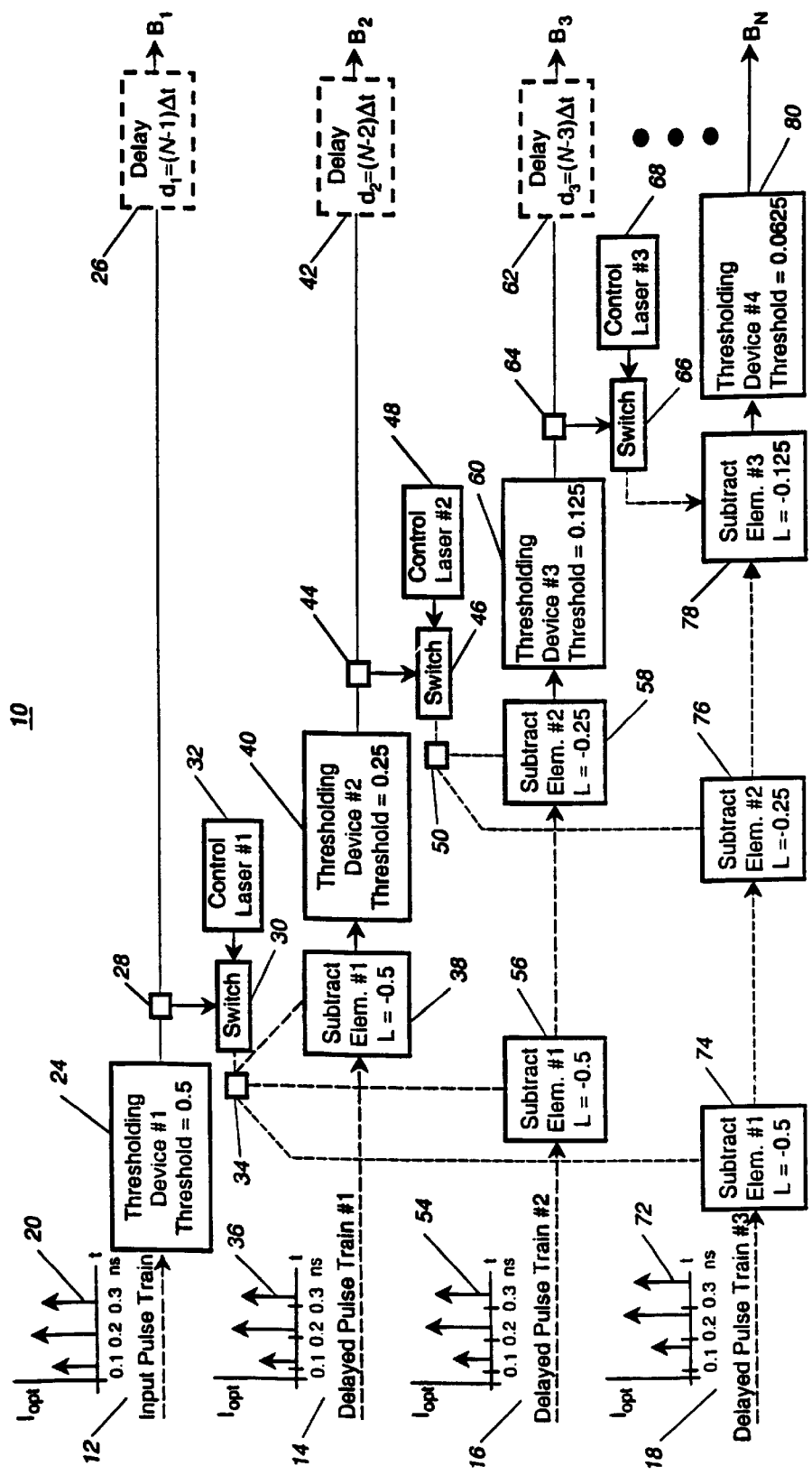
FIG. 1 is a schematic block diagram depicting a general implementation of a downward-folding optical analog-to-digital converter, according to an embodiment of the present invention.

Referring to FIG. 1, an optical A/D converter 10 employing a downward-folding conversion approach, according to an embodiment of the present invention, is illustrated. The converter 10 is a general representation of the optical A/D converter of the invention, and can operate in a hybrid mode (combination of the optical and electrical domains), or only in the optical domain, as will be discussed in the various embodiments below. In this regard, in FIG. 1, each of the solid lines can be either an electrical or optical signal, depending on the particular design, and each of the dotted lines is an optical signal. Suitable fiberoptic cables or the like to send signals in the optical domain or electrical wires to send signals in the electrical domain can be provided where appropriate, as would be well understood to those skilled in the art.

The converter 10 is separated into four interconnected channels 12, 14, 16 and 18, where each channel receives the same sampled pulsed input signal 20, and outputs one of a series of bits $B_1$–$B_N$ representative of a digital conversion of the signal 20, where $B_1$ is the most significant bit (MSB) and $B_N$ is the least significant bit (LSB). The significance of the bits is reduced in each channel moving from the MSB generated by the channel 12 to the LSB generated by the channel 18. As will be discussed in detail below, the bit output in each channel effects the bit determination in each of the successive channels in a downward-folding approach. Four channels are shown by way of a non-limiting example in that any practical number of channels can be provided for any number of output bits depending on the desired resolution. The input signal 20 is a pulsed signal in this design, but may be a continuous wave (CW) optical signal in alternate designs within the scope of the present invention.

The pulsed signal 20 is a pulsed representation of an electrical or optical input signal that is sampled by any suitable sampler (not shown), known in the art, such as a pulsed laser driving a mach-zehnder modulator. Therefore, the intensity of the pulses in the input signal 20 vary over time. The converter 10 has a particular application to be used in connection with the hybrid optical aperturing architecture disclosed in U.S. patent application Ser. No. 09/133,036, filed Aug. 11, 1998, titled "Optical Sample and Hold Architecture," assigned to the assignee of this application and herein incorporated by reference. In the '036 application, an electro-absorption modulator is provided that receives a fixed amplitude optical pulse train from a colliding pulse mode lock (CPM) laser and an RF input signal. The output of the modulator is an optical pulse train where the amplitude of each pulse represents the amplitude of the RF signal at that point in time to provide the sampled signal.

The optical signal from the sampling modulator is split and delayed by a splitter into equivalent pulse train inputs for each channel 12–18 in the converter 10, as shown. Splitting of the input signal 20 provides the advantage of parallel processing. Each input signal 20 applied to the separate channels 14–18 is delayed from the input signal 20 applied to the previous channel by some predetermined delay, where the delay from one channel to a next channel is the same. In this example, each pulse is delayed relative to the same pulse on the previous channel by 20 picoseconds. As depicted in this example, each pulse is very narrow and can be described as an impulse. The delay is based on the amount of processing that occurs in the previous channels so that when a signal from one channel is used in a subsequent channel, the signals are aligned for timing purposes, as will become apparent from the discussion below. Additionally, the modulator normalizes the intensity of the pulses in the signal 20 within a range of zero to some predetermined maximum intensity $I_{max}$, such as from zero to one, so that the amplitude of each pulse falls within this range. The digital output is sent from the converter 10 to a subsequent processing system (not shown).

The optical input signal 20 is applied to a thresholding device 24 in the first channel 12 that determines whether the amplitude or intensity of the particular pulse entering the device 24 is greater than or less than or equal to an intensity representation 0.5 $I_{max}$ that is the middle point between zero and $I_{max}$. If the amplitude of the pulse is greater than 0.5 $I_{max}$, the thresholding device 24 outputs a high signal that sets the MSB $B_1$ high. As mentioned above, the converter 10 is a general representation of the A/D converter of the invention, and thus, the thresholding device 24 can be any suitable optical or electrical comparison device that compares the input pulse to a threshold value 0.5 $I_{max}$ depending on the particular application. If the output signal from the thresholding device 24 is an electrical signal, a suitable photodiode or the like (not shown) can be employed to convert the input signal 20 to an electrical signal prior to the comparison. Therefore, the high bit signal from the thresholding device 24 can be either an optical high signal (light on) or an electrical high signal (voltage potential) depending on the device 24. A delay device 26 is provided to delay the output bit from the device 24 a predetermined period of time to be in sequence with the output bits from the subsequent channels 14–18 so that they appear at the output of the converter 10 at the same time. The delay device 26 can be any suitable delay device for the purposes described herein, as would be appreciated by those skilled in the art, and is a feature of the converter 10 that may not be necessary.

The output signal from the thresholding device 24 is applied to a power splitter 28 that splits off a portion of the output signal from the device 24. The power splitter 28 can be any conventional optical or electrical power splitter depending on the output signal from the thresholding device 24, suitable for the purposes described herein. The split signal from the splitter 28 is applied as a control signal to a switch 30 that is either electrically or optically controlled depending on the particular application. The split portion of the output signal from the thresholding device 24 will be selected so that it has enough power to operate the switch 30. The switch 30 receives a laser beam from a laser 32 that is continually on. If the output signal from the thresholding device 24 is high, the split signal from the splitter 28 controlling the switch 30 will turn the switch 30 off and cause the laser beam from the laser 32 to be blocked. If the output signal from the thresholding device 24 is low or zero, the split control signal applied to the switch 30 is also low, and will cause the switch 30 to be switched on to allow the laser beam from the laser 32 to pass through the switch 30. The laser beam from the laser 32 that passes through the switch 30 is applied to an N–1 beam splitter 34 that separates the beam into three split beams having roughly the same intensity, one for each of the remaining channels 14, 16 and 18, as shown. The splitter 34 can be any conventional splitter or power divider known in the art that is suitable for the purposes described herein to split an optical beam into enough paths depending on the number of remaining channels in the converter 10.

An optical input signal 36 representing the first delayed signal 20 and the split laser beam from the splitter 34 are applied to a subtraction element 38 in the channel 14 that uses a predetermined subtraction value, here 0.5 $I_{max}$. The subtraction element 38 can be any optical subtraction device known in the art that is suitable for the purposes described herein. For example, saturable absorber based and electro-absorption modulator (EAM) subtraction elements can be used as the subtraction element 38, as will be discussed in connection with the embodiments below. The subtraction element 38 operates in the manner such that if the output signal from the device 24 is low and the laser beam from the laser 32 passes through the switch 30, then the delayed input signal 36 passes through the element 38 unchanged. If the output signal from the device 24 is high, the control beam from the splitter 34 is off or low, and the intensity of the delayed input signal 36 is reduced by 0.5 $I_{max}$ in the element 38. Therefore, if the current pulse of the input signal 20 is greater than 0.5 $I_{max}$, then the corresponding delayed pulse in the input signal 36 is reduced by 0.5 $I_{max}$, but if the current pulse of the input signal 20 is less than or equal to 0.5 $I_{max}$, the corresponding pulse passes through the element 38 with no subtraction. Consequently, the output signal from the subtraction element 38 will be less than or equal to 0.5 $I_{max}$ regardless of the intensity of the actual value of the pulse entering the subtraction element 38.

The optical output signal from the subtraction element 38 is applied to a thresholding device 40 that operates in the same manner as the thresholding device 24, except that the threshold value is set to 0.25 $I_{max}$. Therefore, if the output signal from the element 38 is greater than 0.25 $I_{max}$, then the output signal from the device 40 is high and the bit $B_2$ is high, and if the output signal from the element 38 is less than or equal to 0.25 $I_{max}$, then the output signal from the device 40 is low and the bit $B_2$ is low. The bit $B_2$ can also be delayed by a delay device 42 so that the output bit coincides with the bit $B_1$. As above in channel 12, the output signal from the device 40 is applied to a beam splitter 44 that splits off a portion of the output signal from the device 40 and applies it to a switch 46 as a switch control signal. A laser 48 outputs a laser beam to the switch 46 that passes through the switch 46 if the output signal from the device 40 is low, or blocks the laser beam if the output from the device 40 is high. The laser beam from the laser 48 is applied to an N−2 splitter 50 that splits the beam into two beams to be applied to the remaining channels 16 and 18, as shown.

A delayed optical input signal 54 representing a twice delayed input signal 20 is applied to the channel 16. As above, the delayed signal 54 and the split beam from the splitter 34 are applied to a subtraction element 56, that operates in the same manner as the subtraction element 38. Thus, if the output signal from the thresholding device 24 is high, then the subtraction element 56 subtracts 0.5 $I_{max}$ from the signal 54. If the output signal from the thresholding device 24 is low, then the input signal 54 passes through the element 56 unchanged.

The output signal from the subtraction element 56 and the split beam from the splitter 50 are applied to another subtraction element 58. The subtraction element 58 operates in the same manner as the subtraction elements 38 and 56, except that the subtraction value is one-half of 0.5 $I_{max}$ or 0.25 $I_{max}$. If the output signal from the thresholding device 40 is high, then the laser beam from the laser 48 is blocked by the switch 46 and the subtraction element 58 subtracts 0.25 $I_{max}$ from the output signal from the element 56. If the output signal from the thresholding device 40 is low, then the laser beam from the laser 48 passes through the switch 46 and the output signal from the element 56 passes through the element 58 unchanged. Therefore, it is known that the output signal from the element 58 will be less than or equal to 0.25 $I_{max}$, regardless of the actual intensity of the current pulse of the input signal 54.

The output signal from the element 58 is applied to a thresholding device 60 that operates in the same manner as the thresholding devices 24 and 40, except that the threshold value is set to 0.125 $I_{max}$. If the output signal from the subtraction element 58 has an intensity above 0.125 $I_{max}$, then the output signal from the device 60 is high and the bit $B_3$ is high, otherwise the output signal from the device 60 is low and the bit $B_3$ is low. The output signal from the device 60 is applied to a delay device 62 to be aligned with the bits $B_1$ and $B_2$.

The output signal from the thresholding device 60 is also applied to a beam splitter 64 that splits off a portion of the output signal as a control signal applied to a switch 66. A laser beam from a laser 68 is continuously applied to the switch 66 so that if the output signal from the device 60 is high, the laser beam from the laser 68 is blocked by the switch 66, and if the output signal from the thresholding device 60 is low, the beam from the laser 68 passes through the switch 66. The laser beam from the switch 66 is applied to the fourth channel 18, as shown.

A delayed input signal 72 representing the signal 20 delayed N times is applied to the fourth channel 18. The corresponding pulse in the signal 72 and the split beam from the splitter 34 are applied to a subtraction element 74 that operates in the same manner as the subtraction elements 38 and 56. If the output signal from the thresholding device 24 is high, then the subtraction element 74 subtracts 0.5 $I_{max}$ from the signal 72. If the output signal from the thresholding device 24 is low, then the input signal 72 passes through the subtraction element 74 unchanged. The output signal from the subtraction element 74 and the split beam from the splitter 50 are applied to another subtraction element 76 that operates in the same manner as the subtraction element 58. If the output signal from the thresholding device 40 is high, then the subtraction element 76 subtracts 0.25 $I_{max}$ from the output signal from the element 74. If the output signal from the thresholding device 40 is low, then the output signal from the element 74 passes through the element 76 unchanged. The output signal from the subtraction element 76 and the beam from the switch 66 are applied to another subtraction element 78. If the output signal from the thresholding device 60 is high, then the subtraction element 78 subtracts 0.125 $I_{max}$ from the output signal from the element 76. If the output signal from the thresholding device 60 is low, then the output signal from the element 76 passes through the element 78 unchanged. Therefore, it is known that the output signal from the subtraction element 78 is less than or equal to 0.125 $I_{max}$.

The output signal from the subtraction element 78 is applied to a thresholding device 80 that operates in the same manner as the thresholding devices 24, 40 and 60 discussed above, except that the threshold level is set at 0.0625 $I_{max}$. If the output signal from the subtraction element 78 is greater than 0.0625 $I_{max}$, then the output signal from the device 80 is high and the LSB $B_N$ is high, and if the output signal from the thresholding device 80 is less than or equal to 0.0625 $I_{max}$, then the output signal from the device 80 is low and the LSB $B_N$ is low.

As is apparent from this discussion, the converter 10 converters the input signal 20 to a series of bits $B_1$–$B_N$ based on a downward-folding successive approximation scheme, where each channel 14–18 acts on a range of intensities one-half of the range acted on by the preceding channel. Only four bits are discussed herein, with the understanding that more channels can be provided in the same format for additional bits and higher resolution.

In general, for each specific channel m, where $1 \leq m \leq N$, the delayed pulse passes through m–1 subtraction elements before reaching the thresholding device in that channel. The pulse intensity at the input to the thresholding device is reduced by $L_m$, where $L_m = (B_1 * \frac{1}{2} + B_2 * \frac{1}{4} + \ldots + B_{m-1} * \frac{1}{2}^{(m-1)})$, and is therefore in the range from 0.0 to $\frac{1}{2}^{(m-1)}$. The last thresholding device, which has a threshold value equal to $\frac{1}{2}^m$, produces the output bit $B_N$. The analog signal sample conversion output word $[B_1, B_2, \ldots, B_N]$ is then built up from each of the threshold device outputs.

Timing is mostly dictated by the pulse arrival times at the various components in the converter 10. In this fashion, the converter 10 can be considered self-clocking. The most critical timing issues involve the subtraction elements and the output bits. The subtraction elements must be set by the appropriate thresholding device decision before the pulse they process arrives. The subtraction element must then remain in its state until after the pulse is processed, and then must be reset before the next thresholding device decision is made (which corresponds to the next analog signal sample). The same is true for each of the remaining channels. This must be considered when designing the subtraction element and the path delay between the thresholding device and the subtraction element (which must be shorter than the time delay separation between pulse replicas). The output bits also must be synchronized for processing. Introducing appropriate path delays by the delay devices 26, 42 and 60 in each of the $B_N$ paths will allow the signal to be synchronized so that the output digital word, in parallel, arrives at the next processing stage synchronized as required. An alternative is to combine the various MSB paths into a signal path, thus producing a serial output digital word.

Figure 2:
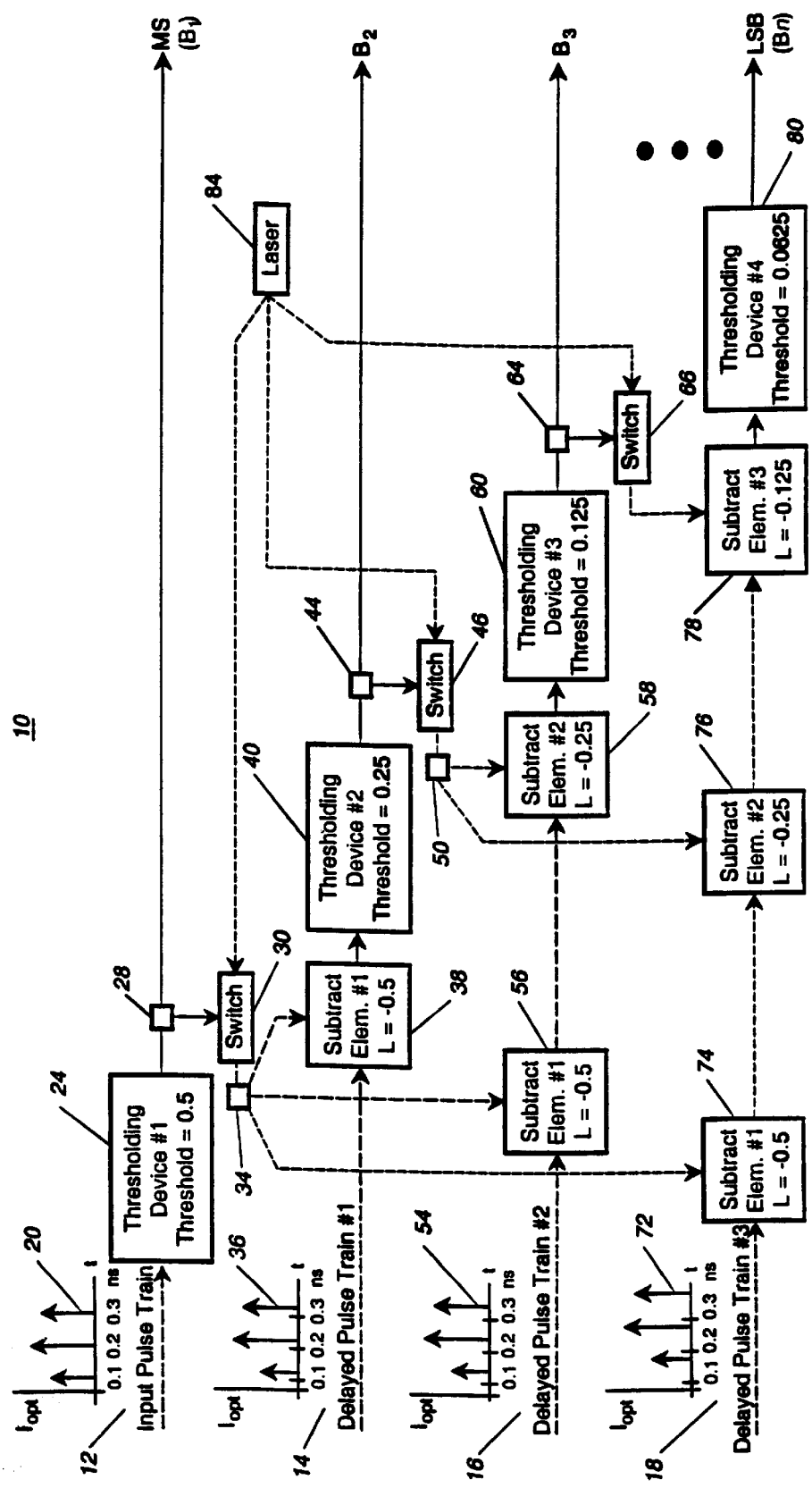
FIG. 2 is a schematic block diagram depicting a modified embodiment of the analog-to-digital converter depicted in FIG. 1.

Referring to FIG. 2, a modification of the A/D converter 10 is shown that eliminates the lasers 32, 48 and 68, and replaces them with a single laser 84. Thus, the laser beam from the laser 84 is applied to each of the switches 30, 46, and 66 for the purposes discussed above. Different applications may require multiple lasers, or just a single laser.

Figure 3:
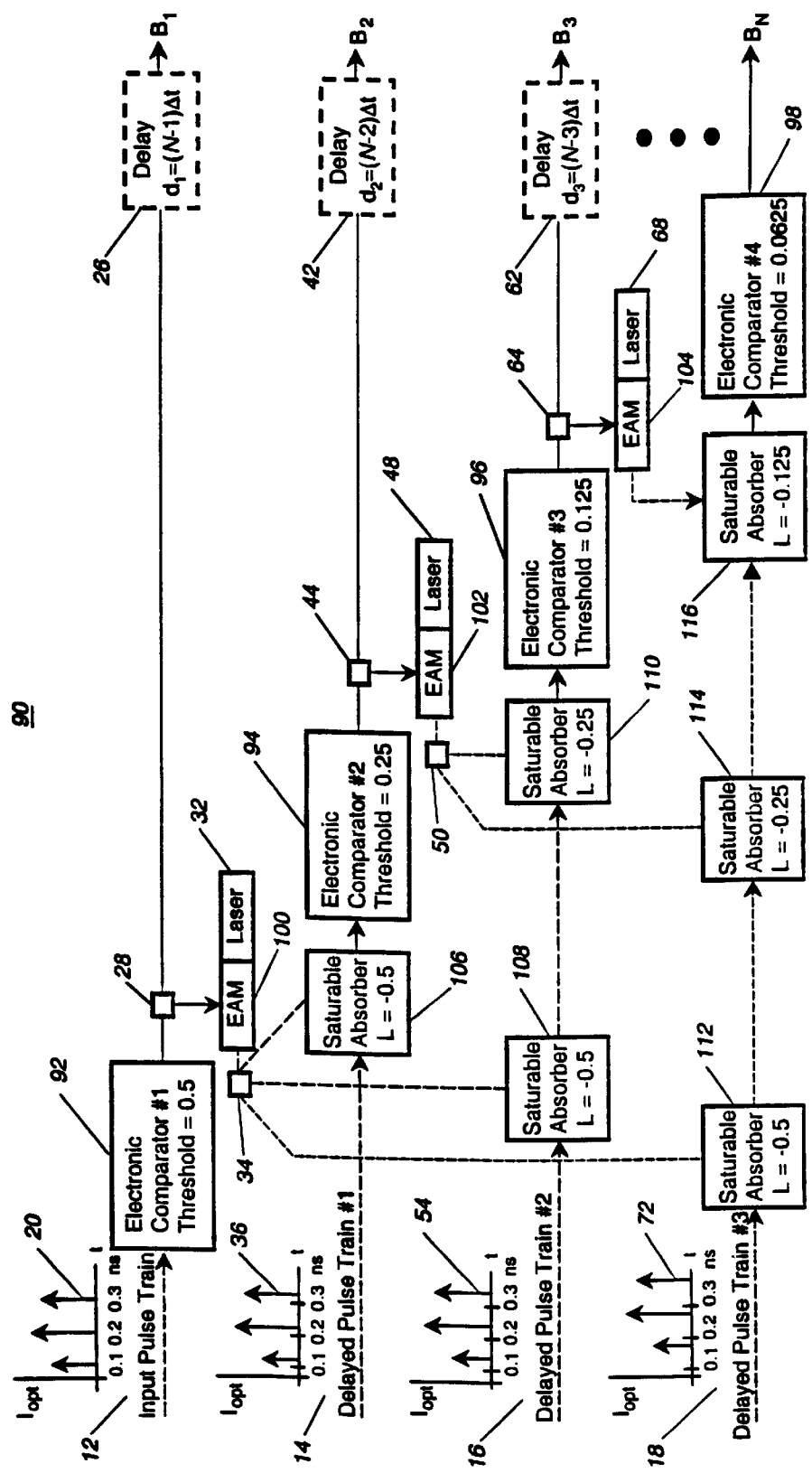
FIG. 3 is a schematic block diagram depicting a downward-folding optical analog-to-digital converter employing saturable absorber subtraction elements and providing an electrical digital output, according to another embodiment of the present invention.

As mentioned above, FIG. 1 is a general depiction of the D/A converter of the present invention. Although the converter 10 receives an optical input, the operation of the converter 10 can be in only the optical domain, or a combination of the optical and electrical domain, as will be discussed below. FIG. 3 depicts an A/D converter 90 that includes variations over the A/D converter 10, discussed above, according to another embodiment of the present invention. In FIG. 3, like components to those referred to in FIG. 1 are labeled with the same reference numeral for clarity purposes. In the converter 90, the dashed signal lines are optical signals, and the solid signal lines are electrical signals, thus the converter 90 operates in both the optical and electrical domain that may be more applicable for certain designs. For the electrical domain, each of the thresholding devices 24, 40, 60 and 80 have been replaced with an electronic comparator 92, 94, 96 and 98, respectively. Suitable photodetectors or the like (not shown) would be used to convert the optical input pulses in the signals 20, 36, 54 and 72 to an electrical signal suitable for the comparators 92–98. The comparators 92–98 compare that electrical input value to a threshold value consistent with the discussion above with respect to the converter 10. Thus, each output signal from the comparators 92–98 is an electrical bit output signal representing the bit value for that channel, and is processed according to the discussion above.

Additionally, each of the optical switches 30, 46 and 66 is replaced with an electro-absorption modulator (EAM) 100, 102 and 104, respectively. An EAM is a known switching device that has an optical input and an optical output, and an electrical control input. The electrical control input is a cut-off voltage $V_c$ that allows or prevents light from passing through the EAM depending on the design. Therefore, the EAM is able to use the split output signals from the electronic comparators 92–98 as the electrical control signal to pass or block the laser beam from the lasers 32, 48 and 68. In this embodiment, the EAM 100, 102 or 104 is combined with the laser 32, 48 or 68, respectively, as a single unit in a manner that would be known to those skilled in the art. The EAMs 100–104 operate in the same general manner as the switches 30, 46, and 66 discussed above, in that if the electrical output signal at the output of each of the comparators 92–96 is low, the light beam from the lasers 32, 48 or 68 passes unimpeded through the EAM 100, 102 or 104. If, however, the output signal from the comparator 92, 94 or 96 is high, the EAM 100, 102 or 104 prevents the laser beam from the laser 32, 48 or 68 from passing through. Thus, the combination of EAM and laser operates in the same manner as the combination of switch and laser discussed above with respect to the converter 10.

Additionally, each of the subtraction elements 38, 56, 58, 74, 76 and 78 is a saturable absorber 106, 108, 110, 112, 114 and 116, respectively. A saturable absorber is an optical device that receives at least two optical inputs whose intensities are combined to either make the absorber transparent, translucent or opaque depending on the design. In this embodiment, the saturable absorbers 106–116 are designed so that if the optical control signal from the respective EAM 100, 102 or 104 is high or passes the laser beam, the saturable absorber 106–116 turns transparent, and passes the optical input signal along the respective channel 14, 16 or 18 unchanged, consistent with the discussion above with respect to the converter 10. If the respective EAM 100, 102 or 104 blocks the laser beam from the laser 32, 48 or 68, the optical input signal along the respective channel 14, 16 or 18 applied to the absorber 106–116 is reduced by the subtraction value. In other words, the saturable absorber 106–116 is translucent in its normal state so that it absorbs a certain amount of the optical input signal depending on the desired subtraction. Thus, the saturable absorber must be designed to be translucent enough to reduce the input signal by the desired subtraction value. The saturable absorbers 106–116 can be any absorber suitable for the purposes described herein, such as a liquid cell including a suitable absorber dye, semiconductor saturable absorber including multiple quantum wells, etc., all known to those skilled in the art. A saturable absorber that may be configured to operate in this manner may be available in the known mode lock lasers.

FIG. 4 depicts an A/D converter 120 that is a modification of the converter 10 discussed above, but has a complete optical implementation, where all of the signal lines are in the optical domain. By operating the converter 120 in the complete optical domain, advantages such as higher bandwidth and increased processing speed can be realized. Like components to those embodiments discussed above are identified by the same reference numerals in the converter 120. In this design, the thresholding devices 24, 40, 60 and 80 are optical comparators 122, 124, 126 and 128, respectively, that compare the input signals 20, 36, 54 and 72 applied to the channels 12, 14, 16 and 18, respectively, to an optical signal at the threshold value, consistent with the discussion above. The optical comparators 122–128 can be any optical comparator suitable for the purposes discussed herein that is able to compare optical intensities. The output signal from each of the optical comparators 122–128 are optical signals that are representative of the bit for that channel.

In this embodiment, the switches 30, 46 and 66 are replaced with optical switches 130, 132, and 134, respectively, that receive optical control signals from the respective comparator 122–126 to control the laser beam from the lasers 32, 48 and 68, in the manner discussed above. One of the optical switches 130 is shown in FIG. 5 to depict its operation. The control signal from the splitter 28 is applied to an optical inverter 136 that inverts the optical signal such that if the output of the comparator 122 is high, the output of the optical inverter 136 is low, and vice-versa. The inverted optical signal from the inverter 136 is applied to a saturable absorber 138 as a control signal. The absorber 138 receives the laser beam from the laser 32. If the output of the comparator 122 is low, then the output of the optical inverter 136 is high or on, and combines with the laser beam input from the laser 32 to make the saturable absorber 138 transparent to pass the laser beam. Likewise, if the output signal from the comparator 122 is high, then the optical output signal from the optical inverter 136 is low or off, so that no additional intensity is provided to the saturable absorber 138, and thus it remains in its opaque mode in this design. Thus, the switch 130 operates in the general manner as discussed above. The saturable absorber 138 can be any suitable absorber for the purposes described herein as discussed above. Likewise, the optical inverter 136 can be any optical inverter suitable for the purposes of the present invention, and can be for example, the optical inverter disclosed in U.S. patent application Ser. No. 09/133,032, filed Aug. 11, 1998, titled "Saturable Absorber Based Optical Inverter", and assigned to the assignee of the instant application. It is noted that no coherence is required between the output bits from the optical comparators 122–128 and the laser beams from the lasers 32, 48 and 68.

Figure 6:
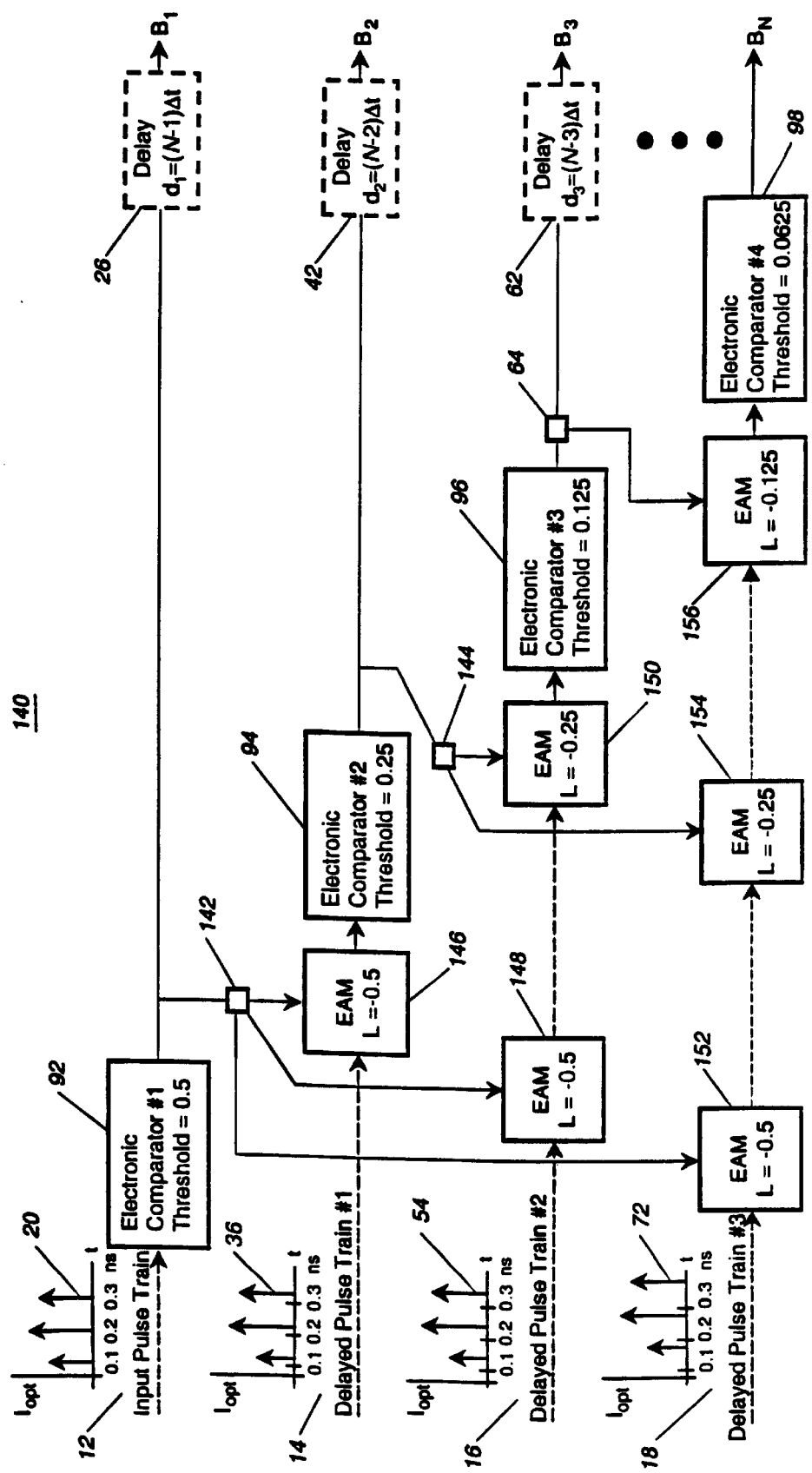
FIG. 6 is a schematic block diagram depicting a downward-folding optical analog-to-digital converter that does not employ lasers and has an electrical digital output, according to another embodiment of the present invention.

FIG. 6 shows another A/D converter 140 that is a variation of the converter 10 discussed above, that operates in both the optical and electrical domain, and does not require the use of lasers. As above, like reference numerals identify the same components in the converters discussed above. In FIG. 6, optical signals are indicated by dashed lines and electrical signals are indicated by solid lines. In this embodiment, the comparators 92–98 are used to provide electrical output signals representative of the bits $B_1$–$B_N$. A splitter 142 replaces the splitter 28 and splits the output signal from the comparator 92 into three output signals for each of the remaining channels 14, 16, and 18. Likewise, a splitter 144 replaces the splitter 44 and splits the output signal from the comparator 94 into two output signals for each of the remaining channels 16 and 18. In this design, the lasers 32, 48 and 68 and the switches 30, 46 and 66 are eliminated and the subtraction elements 38, 56, 58, 74, 76 and 78 have been replaced with EAMs 146, 148, 150, 152, 154, and 156, respectively. The EAMs 146–156 receive the electrical control signals from the respective splitter 142, 144 and 64, and either pass or block the optical input signals 36, 54 and 72 applied to the EAMs 146–156, consistent with the discussion above with reference to the subtraction elements 38, 56, 58, 74, 76 and 78. Particularly, each EAM 146–156 is tuned to a particular subtraction value, such that if the electrical control signal from the preceding channels applied to the EAM 146–156 is low and no voltage is at the electrical input control port, the respective input beam passes through the EAM 146–156 unchanged. If, however, the output from the respective comparator 92–98 is high such that a voltage control signal is present at the electrical control port of the EAM 146–156, the EAM 146–156 reduces the magnitude of the optical input signal by the subtraction value. Thus, the converter 144 operates in substantially the same manner as the converter 10 discussed above, without the need for lasers.

Figure 7:
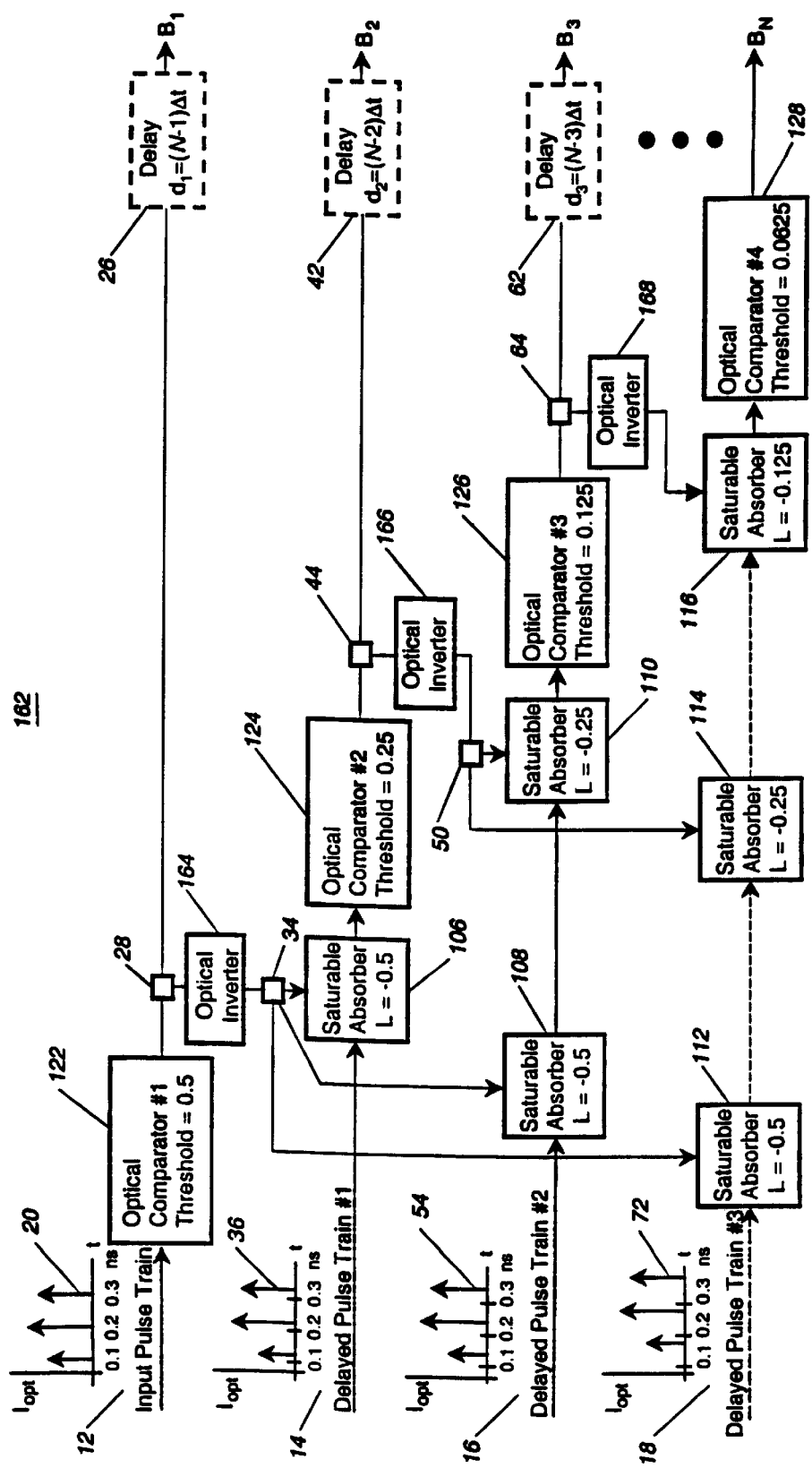
FIG. 7 is a schematic block diagram depicting a downward-folding optical analog-to-digital converter employing saturable absorber subtraction elements without the use of lasers, and having an optical digital output, according to another embodiment of the present invention.

FIG. 7 shows an A/D converter 162 that is a full optical implementation, yet does not use lasers, according to another embodiment of the present invention. As above, like reference numerals are used in FIG. 7 to depict the same components discussed above in the various embodiments. In this embodiment, the combination of the control lasers 32, 48 and 68 and switches 30, 46 and 66 has been removed, and replaced with optical inverters 164, 166 and 168, respectively. As with the optical implementation of the converter 120, the saturable absorbers 106–116 are used for the subtraction elements 38, 56, 58, 74, 76 and 78. As above, the optical inverters 164, 166 and 168 invert the optical output from the optical comparators 122, 124 and 126 so that if the output is high, the output of the inverters 164, 166 and 168 is low, and vice-versa. The optical inverters 164, 166 and 168 can be any suitable optical inverter for the purposes described herein, as discussed above with reference to the optical inverter 136.

The discussion above describes a downward-folding optical A/D converter that includes several variations to allow it to operate in the complete optical domain, or a combination of the optical and electrical domain. Although various implementations and variations are discussed above, other variations can be incorporated within the scope of the present invention, as would be appreciated by those skilled in the art.

The foregoing discussion discloses and describes merely exemplary embodiments of the present invention. One skilled in the art will readily recognize from such discussion, and from the accompanying drawings and claims, that various, changes, modifications and variations can be made therein without departing from the spirit and scope of the invention as defined in the following claims.

What is claimed is:

1. An optical analog-to-digital converter for converting an optical analog signal to a digital signal, said converter comprising:

a plurality of channels receiving the optical analog signal and providing a bit of the digital signal, said plurality of channels including a first channel providing a most significant bit, a last channel providing a least significant bit, and a plurality of intermediate channels between the first channel and the last channel providing bits of lessening significance from the first channel to the last channel in succession, wherein all of the successive channels after the first channel include;

at least one subtraction device receiving the optical input signal and a control signal from a preceding channel, said at least one subtraction device generating an optical subtraction signal that is determined by subtracting a predetermined subtraction value from the optical input signal if a bit generated by a certain one of the preceding channels is high or is determined by passing the optical input signal if the bit generated by the certain one of the preceding channels is low; and a thresholding device being responsive to the optical subtraction signal from the at least one subtraction device and comparing the subtraction signal to a predetermined threshold value, said thresholding device generating a high output signal if the subtraction signal is greater than the threshold value and generating a low output signal if the subtraction signal is less than the threshold value, wherein the output signal from the thresholding device is the output bit for that channel.

2. The converter according to claim 1 wherein each channel includes a single thresholding device and each thresholding device employs a different predetermined threshold value, said first channel being directly responsive to the optical input signal, and wherein the threshold value used by the thresholding device in the first channel is the largest value and the threshold values used by the thresholding devices in the following channels continually decreases in succession to the last channel.

3. The converter according to claim 2 wherein the threshold value used by the thresholding device in the first channel is one-half of a predetermined maximum value representing a maximum intensity of the optical input signal, and the threshold value used by the thresholding device in each of the successive channels is decreased by one-half of the threshold value used in the thresholding device of an immediately preceding channel.

4. The converter according to claim 1 wherein the thresholding device is an electronic comparator that compares an electrical representation of the subtraction signal to an electrical threshold value and generates an electrical bit.

5. The converter according to claim 1 wherein the thresholding device is an optical comparator that compares the subtraction signal to an optical threshold value and generates an optical bit.

6. The converter according to claim 1 wherein each channel preceding the last channel includes a switching device that is responsive to the output bit from the thresholding device, said switching device sending the control signal to the at least one subtraction element in each of the following channels if the output bit is low.

7. The converter according to claim 6 wherein the switching device includes a control laser and a switch, said laser outputting a laser beam that is received by the switch, said switch being responsive to the output bit and passing the laser beam as the control signal if the output bit is low and blocking the laser beam if the output bit is high.

8. The converter according to claim 7 wherein the switch is an optical switch that includes an optical inverter and a saturable absorber, said optical inverter receiving the output bit from thresholding device in the preceding channel and generating an inverted output bit signal, said saturable absorber being responsive to the inverted output bit signal and outputting the laser beam as the control signal if the inverted output bit signal is high and blocking the laser beam if the inverted output bit signal is low.

9. The converter according to claim 6 wherein the switching device includes a control laser and an electro-absorption module, said laser outputting a laser beam that is received by the electro-absorption module, said electro-absorption module being responsive to the output bit and passing the laser beam as the control signal if the output bit is low and blocking the laser beam if the output bit is high.

10. The converter according to claim 1 wherein the at least one subtraction element is an electro-absorption module and the control signal is an electrical control signal.

11. The converter according to claim 1 wherein the at least one subtraction element is a saturable absorber and the control signal is an optical signal.

12. The converter according to claim 1 wherein there are N number of m channels identified consecutively where m is one for the first channel and m is N for the last channel, and wherein each channel includes m−1 subtraction devices.

13. The converter according to claim 12 wherein each subtraction device in each channel uses a different subtraction value than every other subtraction device in that channel and each separate subtraction device is responsive to a same control signal from every preceding channel.

14. The converter according to claim 13 wherein the subtraction devices in each channel uses a subtraction value in successive devices that is one-half of a preceding subtraction device.

15. The converter according to claim 1 wherein the plurality of channels generate the bits by a downward-folding successive approximation scheme.

16. The converter according to claim 1 wherein each channel includes a delay device that delays the bit for that channel so that all of the bits of the converter are aligned.

17. The converter according to claim 1 wherein the optical input signal to each channel is a pulsed signal, wherein the pulsed signal applied to each channel is delayed by a predetermined amount.

18. An optical system for converting an optical analog signal to a digital signal having a plurality of digital data bits, said system comprising a plurality of channels that receive the optical analog signal and output one of the data bits, said plurality of channels including a first channel providing a most significant bit, a last channel providing a least significant bit and a plurality of intermediate channels providing the remaining bits, wherein the channels include thresholding devices and subtraction devices that combine to perform a downward-folding successive approximation conversion of the analog signal.

19. The system according to claim 18 wherein the thresholding devices are selected from the group consisting electronic comparators and optical comparators.

20. The system according to claim 18 wherein the subtraction devices are selected from the group consisting of saturable absorbers and electro-absorption modules.

21. The system according to claim 18 wherein there are N number of m channels identified consecutively where m is one for the first channel and m is N for the last channel, and wherein each channel includes m−1 subtraction devices.

22. The system according to claim 18 wherein the downward-folding approximation conversion reduces a threshold value by one-half in each successive channel.

23. An optical system for converting an optical analog signal to a digital signal having a plurality of digital data bits $B_1, B_2, \ldots B_N$, said system comprising a plurality of m channels that receive the optical analog signal and output one of the data bits, said plurality of m channels including a first channel providing a most significant bit $B_1$, a last channel providing a least significant bit $B_N$ and a plurality of intermediate channels providing the remaining bits, wherein the channels include thresholding devices and subtraction devices, and wherein the optical analog signal passes through m−1 subtraction devices before reaching a thresholding device in a particular channel so that the intensity of the analog signal at the input of the thresholding device is reduced by $L_m$, where $L_m = (B_1 * \frac{1}{2} + B_2 * \frac{1}{4} + \ldots + B_{m-1} * \frac{1}{2}^{(m-1)})$.

24. The system according to claim 23 wherein the optical analog signal applied to any one of the channels is delayed a predetermined amount relative to the optical analog signal applied to e each of the preceding channels.

25. The system according to claim 23 wherein the optical analog signal applied to the thresholding device in each channel is compared to a thresholding value in that channel that is one-half of a thresholding value used in the thresholding device of the immediately preceding channel.

26. An optical analog-to-digital converter for converting an optical analog signal to a digital signal including a plurality of bits, said converter comprising:
   a first channel including a first thresholding device, said first thresholding device being responsive to the optical analog signal and comparing the optical analog signal to a first predetermined threshold value, said first thresholding device outputting a first bit output of the digital signal that is high if the optical analog signal is greater than the first threshold value and outputting the first bit output of the digital signal that is low if the optical analog signal is less than the first threshold value, said first channel further including a splitter that splits the first bit output into a split signal; and
   a second channel including a subtraction device responsive to the optical analog signal and a control signal from the first channel, said subtraction device subtracting a predetermined subtraction value from the optical analog signal if the first bit output from the first channel is high and passing the optical analog signal unchanged if the first bit output from the first channel is low, said second channel further including a second thresholding device that is responsive to an output from the subtraction device, said second thresholding device comparing the output from the subtraction device to a second predetermined threshold value and outputting a second bit output of the digital signal that is high if the output from the subtraction device is greater than the second threshold value and outputting the second bit output of the digital signal that is low if the output from the subtraction device is less than the second predetermined threshold value.

27. The converter according to claim 26 wherein the first and second thresholding devices are selected from the group consisting of electronic comparators and optical comparators.

28. The converter according to claim 26 wherein the subtraction element is selected from the group consisting of electro-absorption modules and saturable absorbers.

29. The converter according to claim 26 wherein the first channel further includes a switching system that is responsive to the split signal from the splitter, said switching device sending the control signal to the subtraction device in the second channel.

30. The converter according to claim 29 wherein the switching system includes a control laser and a switch, said laser outputting a laser beam that is received by the switch, said switch being responsive to the split signal and passing the laser beam as the control signal if the bit output is low and blocking the laser beam if the bit output is high.

31. The converter according to claim 30 wherein the switch is an optical switch that includes an optical inverter and a saturable absorber, said optical inverter receiving the bit output from the splitter and generating an inverted bit output signal, said saturable absorber being responsive to the inverted bit signal and outputting the laser beam as the control signal if the inverted bit output signal is high and blocking the laser beam if the inverted bit output signal is low.

32. The converter according to claim 29 wherein the switching device includes a control laser and an electro-absorption module, said laser outputting a laser beam that is received by the electro-absorption module, said electro-absorption module being responsive to the split signal and passing the laser beam as the control signal if the bit output is low and blocking the laser beam if the bit output is high.

33. The converter according to claim 26 wherein the optical input signal is a pulsed signal, and wherein the optical input pulse signal applied to the second channel is delayed by a predetermined amount relative to the optical pulse input signal applied to the first channel.

34. The converter according to claim 26 wherein the first threshold value and the subtraction value are one-half of a predetermined maximum intensity value of the input signal, and the second threshold value is one-half of the first threshold value.

35. An optical analog-to-digital converter for converting an optical analog signal to a digital signal including a plurality of bits, said converter comprising:
   a first channel including a first thresholding device, said first thresholding device being responsive to the optical analog signal and comparing the optical analog signal to a first predetermined threshold value, said first thresholding device outputting a first bit output of the digital signal that is high if the optical analog signal is greater than the first threshold value and outputting the first bit output of the digital signal that is low if the optical analog signal is less than the first threshold value, said first channel further including a first splitter that splits the first bit output into a first split signal and a first switching system that is responsive to the first split signal from the first splitter, said first switching system generating a first control signal;
   a second channel including a first subtraction device that is responsive to the optical analog signal and the first control signal from the first switching device, said first subtraction device subtracting a first predetermined subtraction value from the optical analog signal if the first bit output from the first channel is high and passing the optical analog signal unchanged if the first bit output from the first channel is low, said second channel further including a second thresholding device that is responsive to an output from the first subtraction device, said second thresholding device comparing the output from the first subtraction device to a second predetermined threshold value and outputting a second bit output of the digital signal that is high if the output from the first subtraction device is greater than the second threshold value and outputting the second bit output of the digital signal that is low if the output from the first subtraction device is less than the second predetermined threshold value, said second channel further including a second splitter that splits the second bit output from the second thresholding device into a second split signal and a second switching system that is responsive to the second split signal from the second splitter, said second switching system generating a second control signal;
   a third channel including a second subtraction device that is responsive to the optical analog signal and the first control signal from the first channel, said second subtraction device subtracting the first predetermined subtraction value from the optical analog signal if the first bit output from the first channel is high and passing the optical analog signal unchanged if the first bit output from the first channel is low, said third channel further including a third subtraction device that is responsive to an output from the second subtraction device, said third subtraction device subtracting a second predetermined subtraction value from the output from the second subtraction device if the second bit output from the second channel is high and passing the output from the second subtraction device unchanged if the bit output for the second channel is low, said third channel further including a third thresholding device that is responsive to an output from the third subtraction device, said third thresholding device comparing the output from the third subtraction device to a third predetermined threshold value and outputting a third bit output of the digital signal that is high if the output from the third subtraction device is greater than the third threshold value and outputting the third bit output of the digital signal that is low if the output from the third subtraction device is less than the third predetermined threshold value, said third channel further including a third splitter that splits the third bit output from the third thresholding device into a third split signal and a third switching system that is responsive to the third split signal from the third splitter, said third switching system generating a third control signal; and a fourth channel including a fourth subtraction device that is responsive to the optical analog signal and the first control signal from the first channel, said fourth subtraction device subtracting the first predetermined subtraction value from the optical analog signal if the first bit output from the first channel is high and passing the optical analog signal unchanged if the first bit output from the first channel is low, said fourth channel further including a fifth subtraction device that is responsive to an output from the fourth subtraction device and the second control signal, said fifth subtraction device subtracting the second predetermined subtraction value from the output from the fourth subtraction device if the second bit output from the second channel is high and passing the output from the fourth subtraction device unchanged if the second bit output from the second channel is low, said fourth channel further including a sixth subtraction device that is responsive to an output from the fifth subtraction device, said sixth subtraction device subtracting a third predetermined subtraction value from the output from the fifth subtraction device if the third bit output from the third channel is high and passing the output from the fifth subtraction device unchanged if the third bit output from the third channel is low, said fourth channel further including a fourth thresholding device that is responsive to an output from the sixth subtraction device, said fourth thresholding device comparing the output from the sixth subtraction device to a fourth predetermined threshold value and outputting a fourth bit output of the digital signal that is high if the output of the sixth subtraction device is greater than the fourth threshold value and outputting the fourth bit output of the digital signal that is low if the output from the sixth subtraction device is less than the fourth predetermined threshold value.

36. The converter according to claim 35 wherein the first threshold value is one-half of a maximum intensity of the optical analog signal, the second thresholding value is one-half of the first threshold value, the third threshold value is one-half of the second threshold value, and the fourth threshold value is one-half of the third threshold value.

37. The converter according to claim 36 wherein the first subtraction value is one-half of the maximum intensity, the second subtraction value is one-half of the first subtraction value and the third subtraction value is one-half of the second subtraction value.

38. The converter according to claim 35 wherein the first, second, third and fourth thresholding devices are selected from the group consisting of electronic comparators and optical comparators.

39. The converter according to claim 35 wherein the first, second, third, fourth, fifth and sixth subtraction elements are selected from the group consisting of electro-absorption modules and saturable absorbers.

40. The converter according to claim 35 wherein the first, second and third switching systems each include a control laser and a switch, said laser outputting a laser beam that is received by the switch, said switch being responsive to the respective split signal and passing the laser beam as the respective control signal if the respective bit output is low and blocking the laser beam if the respective bit output is high.

41. The converter according to claim 40 wherein the switch is an optical switch that includes an optical inverter and a saturable absorber, said optical inverter receiving the respective bit output from the respective splitter and generating an inverted bit output signal, said saturable absorber being responsive to the inverted bit signal, said saturable absorber outputting the laser beam as the respective control signal if the inverted bit output signal is high and blocking the laser beam if the inverted bit output signal is low.

42. The converter according to claim 35 wherein the first, second and third switching systems each include a control laser and an electro-absorption module, said laser outputting a laser beam that is received by the electro-absorption module, said electro-absorption module being responsive to the respective split signal and passing the laser beam as the respective control signal if the respective bit output is low and blocking the laser beam if the respective bit output is high.

43. The converter according to claim 35 wherein the optical input signal is a pulsed signal, and wherein the optical pulsed input signal applied to the second channel is delayed by a predetermined amount relative to the optical pulsed input signal applied to the first channel, the optical pulsed input signal applied to the third channel is delayed by a predetermined amount relative to the optical pulsed input signal applied to the second channel, and the optical pulsed input signal applied to the fourth channel is delayed by a predetermined amount relative to the optical pulsed input signal applied to the third channel.

44. The converter according to claim 35 wherein the first bit output from the first thresholding device is applied to a first delay device, the second bit output from the second thresholding device is applied to a second delay device, and the third bit output from the third thresholding device is applied to a third delay output so that the bits in the digital signal are aligned.

45. A method of converting an optical analog signal to a digital signal including a plurality of bits, comprising:

providing a first channel that is responsive to the optical analog signal, said first channel generating a first bit of the digital signal;

applying the optical analog signal to a first thresholding device in the first channel that compares the optical analog signal to a first threshold value, wherein the output of the first channel is high if the optical analog signal is greater than the first threshold value and is low if the optical analog signal is less than the first threshold value, where the output of the first thresholding device is the first bit;

generating a first control signal that is indicative of whether the first bit is high or low;

providing a second channel that is responsive to the optical analog signal, said second channel generating a second bit of the digital signal;

applying the optical analog signal to a first subtraction device in the second channel that is responsive to the first control signal, said first subtraction device subtracting a first predetermined subtraction value from the optical analog signal if the first bit is high and passing the analog signal unchanged if the first bit is low; and applying an output from the first subtraction device to a second thresholding device, said second thresholding device comparing the output from the first subtraction device to a second predetermined threshold value, wherein the output of the second channel is high if the output from the first subtraction device is greater than the second thresholding value and is low if the output of the second subtraction device is less than the second threshold value, where the output of the second thresholding device is the second bit.

46. The method according to claim 45 further comprising generating a second control signal that is indicative of whether the second bit is high or low, and providing a third channel that receives the optical analog signal and the second control signal, said third channel generating a third bit of the digital signal.

47. The method according to claim 46 further comprising applying the optical analog signal to a second subtraction device in the third channel that is responsive to the first control signal, said second subtraction device subtracting the first predetermined subtraction value from the optical analog signal if the first bit from the first channel is high and passing the optical analog signal unchanged if the first bit from the first channel is low, and applying an output from the second subtraction device to a third subtraction device in the third channel, said third subtraction device subtracting a second predetermined subtraction value from the output from the second subtraction device if the second bit from the second channel is high and passing the output from the second subtraction device unchanged if the second bit from the second channel is low, and applying an output from the second subtraction device to a third thresholding device in the third channel, said third thresholding device comparing the output from the third subtraction device to a third predetermined threshold value and outputting the third bit of the digital signal high if the output from the third subtraction device is greater than the third threshold value and outputting the third bit of the digital signal low if the output from the third subtraction device is less than the third predetermined threshold value.

48. The method according to claim 45 wherein generating a first control signal includes applying an output from the first thresholding device to a switching system that passes the control signal if the output of the first thresholding device is low and preventing the control signal from passing if the output of the first thresholding device is high.

49. The method according to claim 46 wherein the optical analog signal is delayed from the time it is applied to the second channel from the time it is applied to the first channel, and it is delayed from a time that it is applied to the third channel from the time that it is applied to the second channel.

50. The method according to claim 45 wherein the optical analog signal is a pulsed signal generated by an optical sampler.

* * * * *